US012762239B2

(12) United States Patent
Dewan

(10) Patent No.: US 12,762,239 B2
(45) Date of Patent: Oct. 13, 2026

(54) AUTOMATIC SYSTEM FOR DYNAMIC ATTESTATION FOR DEVICE FIRMWARE

(71) Applicant: Microsoft Technology Licensing, LLC, Redmond, WA (US)

(72) Inventor: Prashant Dewan, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 18/654,115

(22) Filed: May 3, 2024

(65) Prior Publication Data

US 2025/0342255 A1 Nov. 6, 2025

(51) Int. Cl.
*G06F 21/57* (2013.01)
*H04L 9/32* (2006.01)

(52) U.S. Cl.
CPC .......... *G06F 21/572* (2013.01); *H04L 9/3247* (2013.01); *G06F 2221/033* (2013.01)

(58) Field of Classification Search
CPC .. G06F 21/572; G06F 2221/033; G06F 21/57; H04L 9/3247
See application file for complete search history.

(56) References Cited

U.S. PATENT DOCUMENTS 5,752,042 A * 5/1998 Cole ......................... G06F 8/65 707/999.203
2006/0119884 A1* 6/2006 Choi ...................... G06K 15/18 358/1.15
2009/0307302 A1* 12/2009 Tennant .............. H04L 67/1095 709/203
2018/0062848 A1* 3/2018 Gorman ................ H04L 9/3247
2018/0121656 A1* 5/2018 Scherer, III ........... G06F 21/575
2019/0325432 A1* 10/2019 Ow .................... G06Q 20/3678
2019/0342168 A1* 11/2019 Lin ....................... G06F 16/258
2020/0100108 A1* 3/2020 Everson .............. H04W 12/041
2023/0400840 A1* 12/2023 Wagener ............ G05B 19/0426

OTHER PUBLICATIONS

Hardt, D., "The OAuth 2.0 Authorization Framework", Internet Engineering Task Force (IETF), Request for Comments: 6749, Retrieved from: https://datatracker.ietf.org/doc/html/rfc6749, Oct. 2012, 76 Pages.
"What is OpenID Connect", Retrieved From: https://openid.net/developers/how-connect-works/, accessed on Apr. 3, 2024, 6 Pages.

* cited by examiner

*Primary Examiner* — Theodore C Parsons
*Assistant Examiner* — Howard H. Louie

(57) ABSTRACT

Examples of the present disclosure describe devices, systems, and methods for dynamically validating a device's firmware. In examples, an attestation system receives from a platform an attestation report populated with information about components in the platform. The attestation system parses the attestation report to identify web service endpoints associated with a component of the components and initializes a connection with an endpoint of the endpoints. The attestation service receives over the connection a response from the endpoint that includes a code to evaluate the validity of firmware in the component. The attestation service evaluates and confirms the validity of the firmware and transfers the response to the component.

20 Claims, 8 Drawing Sheets

AUTOMATIC SYSTEM FOR DYNAMIC ATTESTATION FOR DEVICE FIRMWARE

BACKGROUND

Cloud service providers (CSPs) and other data centers with racks of computing systems that host hardware components, such as central processing units (CPUs), graphical processing units (GPUs), network cards, and storage devices. CSPs attest to the validity of firmware of hardware components to determine whether the firmware is corrupted or outdated. Traditionally, firmware validation is performed by comparing the computed hash of firmware of a hardware component to a golden hash provided by a vendor of the hardware component. This manual process of providing golden hashes for comparison constrains upgrades to a hardware component and firmware of a hardware component until the receipt of the latest golden hashes from a vendor of a hardware component. Further, a simple comparison of hashes in current systems leads to a binary response of whether the firmware is valid or needs to be immediately updated. Also, the hashes do not provide the user readable format of messages to understand what the firmware updates entail.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for implementing devices for persisting containers across upgrades.

According to one or more embodiments of the present disclosure, a system to attest device firmware includes a processor and a memory coupled to the processor, consisting of computer-executable instructions executed by the system to perform operations. The operations include receiving an attestation report from a platform populated with information about one or more platform components. An attestation service parses the attestation report to identify web service endpoints associated with a platform component and initializes a connection with the web service endpoint. The attestation service then receives a response with a code to evaluate the validity of the firmware for the platform component. The attestation service, upon evaluating the validity of the code, transfers the response to the platform component.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following Figures.

DETAILED DESCRIPTION

Figure 1:
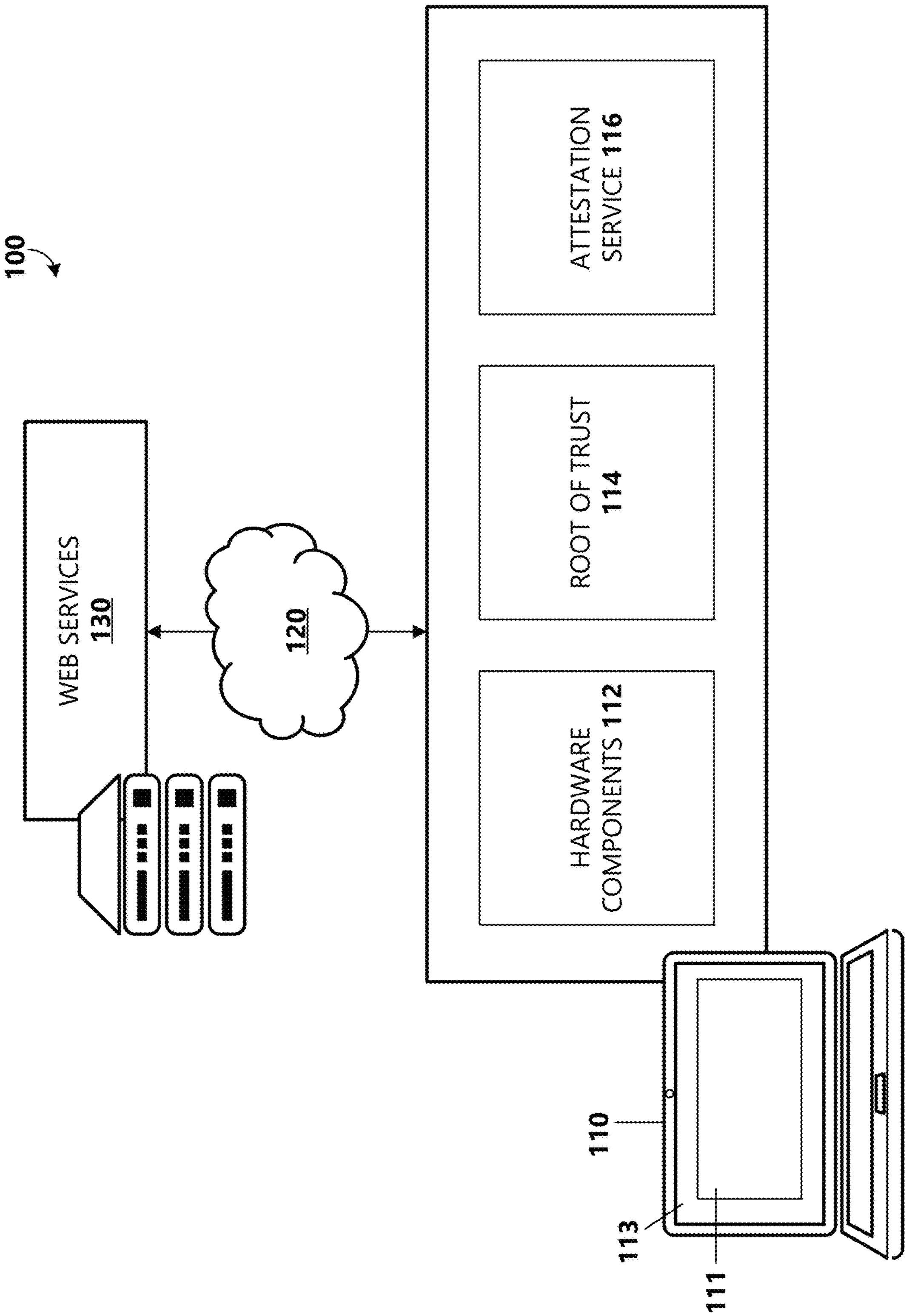
FIG. 1 illustrates a block diagram of an example attestation system for dynamically validating device firmware.

The firmware of hardware components is managed by validating the firmware to confirm that the firmware is not altered and/or is up to date. Traditionally, firmware is checked for alterations from unintentional corruption during the transmission of firmware from the vendor of the hardware components. The firmware is also checked for alterations from a malicious actor tampering with the firmware. The firmware is validated against alterations by reading back the entire firmware code, which can be time-consuming. Alternatively, the firmware is validated using an alphanumeric identifier calculated from the firmware code using mathematical functions and comparing the calculated alphanumeric identifier to an alphanumeric identifier provided by a vendor of a hardware component running the firmware. Firmware can be validated against alterations due to unintentional corruptions using alphanumeric identifiers, such as a checksum calculated using simple techniques such as cyclic redundancy check (CRC). More complex techniques, such as calculating hashes of the firmware code, are employed to generate alphanumeric identifiers to validate firmware against alterations made by malicious actors.

Firmware is updated regularly to access new features and ensure any known security vulnerabilities are resolved in the new versions. Current systems validate the firmware to confirm it is up to date by comparing an alphanumeric identifier, such as a hash generated from the firmware code of a hardware component, to a golden hash provided by a vendor of a hardware component. A golden hash is a hash provided by a known authority, such as a manufacturer of a hardware component, who is regarded to have the valid version of a firmware that can run on the hardware component.

Existing computing systems employ various trust and verification technologies to validate the firmware of hardware components of a computing system. For example, technologies such as secure boot, measured/trusted boot, and trusted platform module (TPM) validate the firmware code by providing signed/certified code from known sources; secure locations for storing cryptographic keys to encrypt/decrypt firmware code and alphanumeric identifiers calculated from firmware code; and tamper-proof hardware storing calculated identifiers, certificates, and cryptographic keys. Some systems use these technologies and an attestation service to validate the firmware.

Existing computing systems confirm the validity of the firmware code during the boot process by accessing the firmware code from a known source. The known source can point to a trusted location to access firmware code. During the boot process of a computing system, low-level firmware is picked from a unified extensible firmware interface (UEFI). UEFI checks the signature of the bootloader firmware to continue with the bootup process. UEFI also stores encryption keys, which can be used to check the signature of the bootloader by matching the signature to the stored encryption keys. Validating firmware using trusted authorities is limited to a low-level boot process and does not validate other firmware, such as firmware on a GPU. Further, using trusted sources does not solve the issue of validating the state of firmware code, and a malicious actor can alter the firmware code presented at a trusted source.

Existing computing systems resolve some of the limitations of validating firmware using technologies such as measured/trusted boot and TPM by determining an alphanumeric identifier representing the current state (e.g., version) of the firmware running on a hardware component and comparing it against a known alphanumeric identifier of the latest version of the firmware. For example, a trusted or measured boot may evaluate the firmware by measuring it to generate an alphanumeric identifier in the form of a hash and compare it against a hash of firmware previously stored in a secure location, such as TPM. While such solutions can resolve the issue of identifying if the firmware is altered from its known valid state, they do not determine whether to update the firmware to resolve corruption of existing firmware (e.g., unintentionally during transportation or intentionally by a malicious actor) for resolution of known vulnerabilities, improvement of performance, or addition of new features. Existing systems resolve some of these issues using an attestation service to attest the latest state (e.g., firmware version, status of firmware license, version of hardware component running firmware) of valid firmware and allow for firmware updates. An attestation service receives golden hashes representing the latest valid state of the firmware, and compares the golden hashes against hashes of the firmware code computed by a computing system hosting the hardware components running the firmware. The attestation service still has limitations, which are presented below. Disclosed herein are systems that improve the architecture of attestation service for firmware validation that resolves the limitations of existing attestation services.

In the current systems using attestation services, firmware is not updated until the associated golden hashes are received by a computing system hosting the hardware components. This limits the firmware from being validated and updated dynamically when a CSP is ready to perform an update and/or the computing system is available for update.

Furthermore, a hash represents a version of a firmware and does not provide any additional information about the architecture of the firmware or the hardware component running the firmware. A lack of understanding of the architecture of a hardware component can cause challenges when using the hash to validate the firmware. For example, when a vendor provides multiple hashes representing sub-components of a hardware component, such as a graphics card with separate firmware for the GPU processors, accelerators, cooling units, and voltage regulation units. In such scenarios, a CSP is unaware of the mapping between hashes and sub-components or the existence of the sub-components and the order to use the hashes to validate the firmware of a hardware component.

Moreover, validating firmware by comparing hashes results in a binary behavior of either confirming the firmware's validity when there is a match or updating the firmware when the hashes do not match. Combining limited information provided by a hash representation of firmware with the binary behavior of hash comparison for firmware validation results in updating firmware when unnecessary. For example, when a firmware update includes updates to features that a CSP has turned off, a simple comparison of the hash of firmware currently running on a hardware component to the updated firmware results in a firmware update that could have been avoided. Such avoidance of unnecessary firmware updates by understanding the firmware architecture reduces downtime of the computing systems due to firmware updates of hardware components hosted by the computing systems.

As the hashes do not have information understandable to a user of a hardware component, the user is unaware of what changes occurred in the firmware. The firmware updates can be for features that need not be applied, such as features currently configured to be turned off by a user (e.g., an administrator of a CSP or an end user of the CSP) of a hardware component, or the updates can be for features that need to or should be applied, such as features that resolve security vulnerabilities. Further, firmware updates are for supporting the updated hardware of a hardware component. A user readable message explaining the firmware updates and the need to update the firmware is required (in addition to the hashes) when validating firmware running on a hardware component.

Requirements for a firmware update can cause the hardware components to be unusable and cause downtime of the computing system hosting the hardware components. Environments like a CSP require a very high uptime. To maintain the high uptime, the firmware updates need to be managed by avoiding firmware updates until necessary. As the firmware hashes do not have additional information, it is difficult for the existing systems to determine whether a firmware update is necessary or can be skipped.

Disclosed herein are systems that determine whether firmware updates for new features, security vulnerabilities, and new hardware are necessary or can be skipped to avoid downtime. Further, disclosed systems provide user readable messages explaining what the firmware updates include. The user readable messages can also include instructions on whether to update the firmware.

Figure 8:
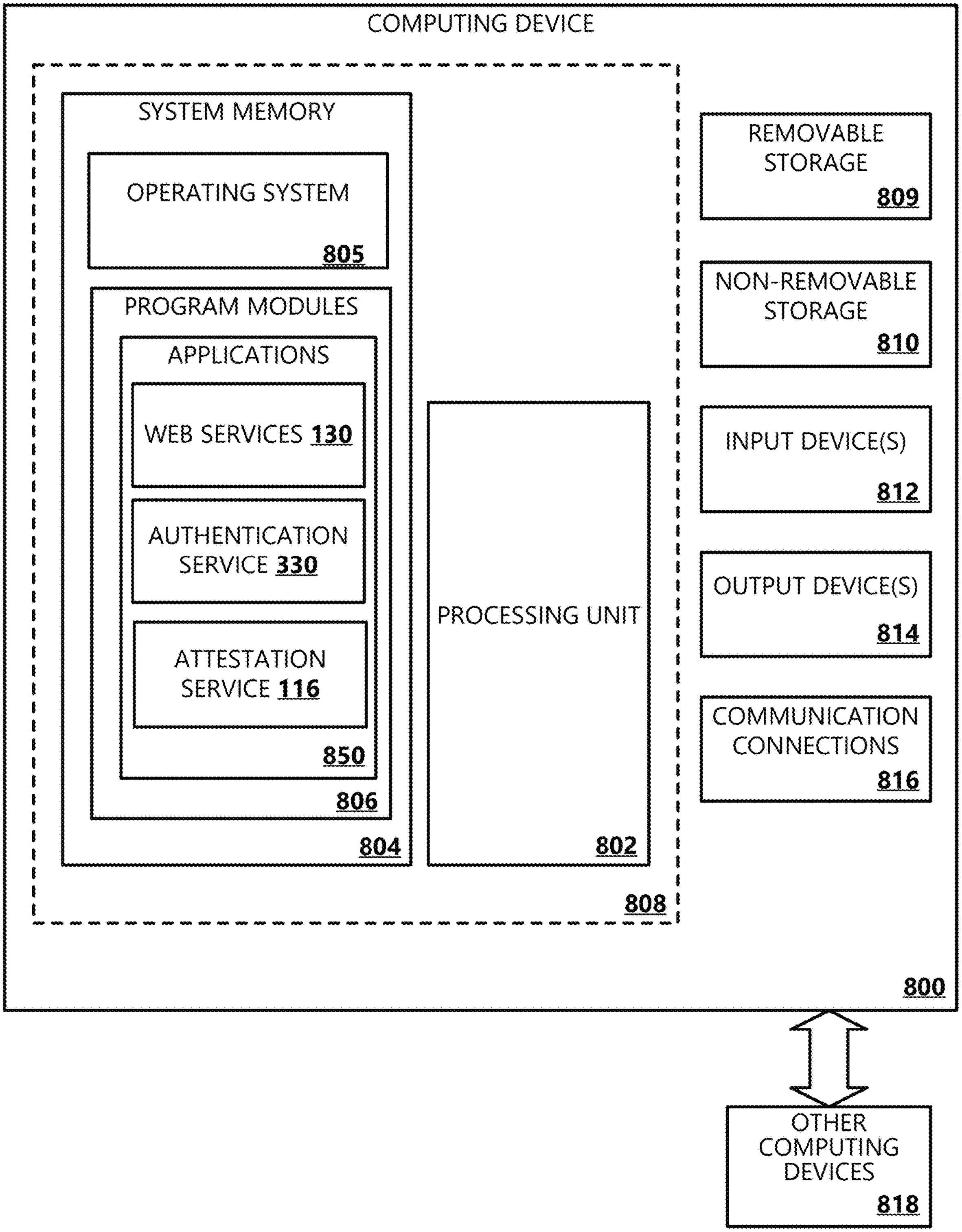
FIG. 8 is a block diagram illustrating an example of the physical components of a computing device for practicing aspects of the disclosure.

FIG. 1 illustrates a block diagram of an example attestation system for dynamically validating device firmware. The system 100, as depicted, is a combination of interdependent components that interact to form an integrated whole. Some components of system 100 are illustrative of software applications, systems, or modules that operate on a computing system or across a plurality of computing systems. Any suitable computer system(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and use resources or facilities of such a system. An example of processing device(s) comprising such an operating environment is depicted in FIG. 8. In another example, the components of systems disclosed herein are distributed across multiple processing devices.

In FIG. 1, system 100 comprises computing device 110, application user interfaces (UIs) 111, display screen 113, hardware components 112, root of trust (ROT) 114, attestation service 116, network 120, and web services 130.

Although system 100 is depicted as comprising a particular combination of computing devices and components, the scale and structure of devices and components described herein may vary and may include additional or fewer components than those described in FIG. 1. For instance, web services 130 may be implemented by computing device 110 and/or attestation service 116 may be implemented remotely from computing device 110.

According to example implementations, computing device 110 may take a variety of forms, including, for example, desktop computers, laptops, tablets, smartphones, wearable devices, gaming devices/platforms, virtualized reality devices/platforms (e.g., virtual reality (VR), augmented reality (AR), mixed reality (MR)), etc. The computing device 110 has an operating system that provides a graphical UI (GUI) that allows users to interact with the computing device 110 via graphical elements, such as application windows (e.g., display areas), buttons, icons, and the like. For example, the graphical elements are displayed on a display screen 113 of the computing device 110. The graphical elements can be selected and manipulated via user inputs received via various input device types (e.g., keyboard, mouse, stylus, touch, spoken commands, gesture).

Hardware components 112 may include various hardware needed to run computing device 110. Hardware components 112 may include hardware for receiving input and generating output, such as processor units, graphics cards, input/output (I/O) controller cards, and network cards. Hardware components 112 may also include hardware to run the input and output hardware, such as a voltage controller.

ROT 114 is a trusted entity that stores information about firmware running on hardware components 112 and the program code that processes and generates information about firmware. ROT 114 determines and circulates attestation reports of firmware running on hardware components 112. The attestation reports are populated with firmware information to confirm the validity of the firmware running on hardware components 112. The firmware information may include an alphanumeric identifier, such as a hash, calculated using the firmware code, a configuration of the firmware describing what features of the firmware turned on and what parameters and their values are provided as input, a version of the hardware component running the firmware, a signature to authenticate the information. ROT 114 may be a combination of multiple components providing security and trust for the code loading in computing device 110. In examples, ROT 114 includes functions such as secure boot providing a secure location for storing firmware, measured boot evaluating firmware to generate a hash representation to validate the state of firmware, and trusted boot providing encryption keys and signatures to secure the hash and other data, such as version of hardware component required for validating firmware. It also stores the state of firmware and other code, such as an operating system running on a computing device 110. ROT 114 may store keys for encryption/decryption and signing code accessed for loading computing device 110. ROT 114 may be software, hardware, such as TPM, or a combination thereof. For example, ROT 114 may be a firmware that performs operations such as measuring the firmware code of the hardware components. ROT 114 may store within itself the trusted data of firmware information provided by a firmware vendor (e.g., vendor name, firmware version, allowed versions of hardware component, encryption keys, signature) and firmware information computed by ROT 114 (e.g., hash generated by measuring firmware code). ROT 114 is a trustworthy mediator that provides data, such as firmware information, associated with computing device 110 to attestation service 116 to attest to and confirm the validity of the firmware. As part of the mediation to validate firmware, ROT 114 retrieves data from hardware components 112, such as information about versions of hardware components 112 and versions of firmware running on hardware components 112. In one instance, ROT 114 generates an attestation report for hardware components 112 populated with the retrieved information and transmits the attestation report to attestation service 116.

Attestation service 116 attests the firmware information retrieved from hardware components 112 and stored in ROT 114. Attestation service 116 receives the firmware information as part of an attestation report, which includes a request to confirm the validity of firmware running on hardware components 112. Attestation service 116 may receive individual attestation requests for each hardware component of hardware components 112. In some examples, ROT 114 determines the groups of hardware components 112 to include in an attestation report transmitted to attestation service 116. A detailed description of an attestation report is presented in FIG. 3 description below.

Attestation service 116 reviews the attestation report to validate the firmware and confirm the validity to ROT 114. Attestation service 116 confirms the validity of firmware running on a hardware component of hardware components 112 by reviewing the version of the firmware in the context of the latest version of the firmware. As part of firmware validation, attestation service 116 may compare the hash of the firmware running on a hardware component listed in the attestation report to a golden hash of the firmware provided by the vendor of the hardware component. The golden hash may be provided directly by the vendor or computed dynamically and provided through a remote service, such as web services 130. Attestation service 116 may consider the firmware running on a hardware component invalid if it does not match the golden hash of the latest version of the firmware. In some examples, attestation service 116 may confirm the validity of the firmware running on a hardware component even if its hash does not match the golden hash of the latest version of the firmware. Attestation service 116 may perform a multi-level comparison before confirming the validity of the firmware running on a hardware component. In some examples, the hardware and firmware features may be compared to determine if the firmware running on a hardware component needs to be updated. Validation of the firmware may include validating the version of the firmware and the firmware code itself. In some examples, validation may include validating the configuration of firmware running on hardware components 112 to ensure certain security policies are followed. A detailed description of firmware validation scenarios using information other than the computed hash is presented in FIG. 3 description below.

Attestation service 116 may report validation of a firmware by checking the firmware is valid and not outdated or corrupted. Attestation service 116 may additionally provide information on why the existing firmware running on a component of hardware components 112 is invalid. System 100 may use the information to resolve the validity issue. In some examples, the information may be a user readable message for the user of system 100 to take corrective actions to validate firmware. For example, the message may list the version of the firmware to download, or the configuration of firmware to satisfy the security policy.

Web services 130 may be a server providing information about the latest firmware versions of hardware components 112. Attestation service 116 may query web services 130 for information about the latest version of firmware to confirm the validity of the firmware running on hardware components 112. Web services 130 may operate on a computing device located remotely from the computing device 110. For instance, the computing device 110 may communicate with web services 130 using one or a combination of networks 120 (e.g., a private area network (PAN), a local area network (LAN), and a wide area network (WAN)). In some examples, web services 130 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
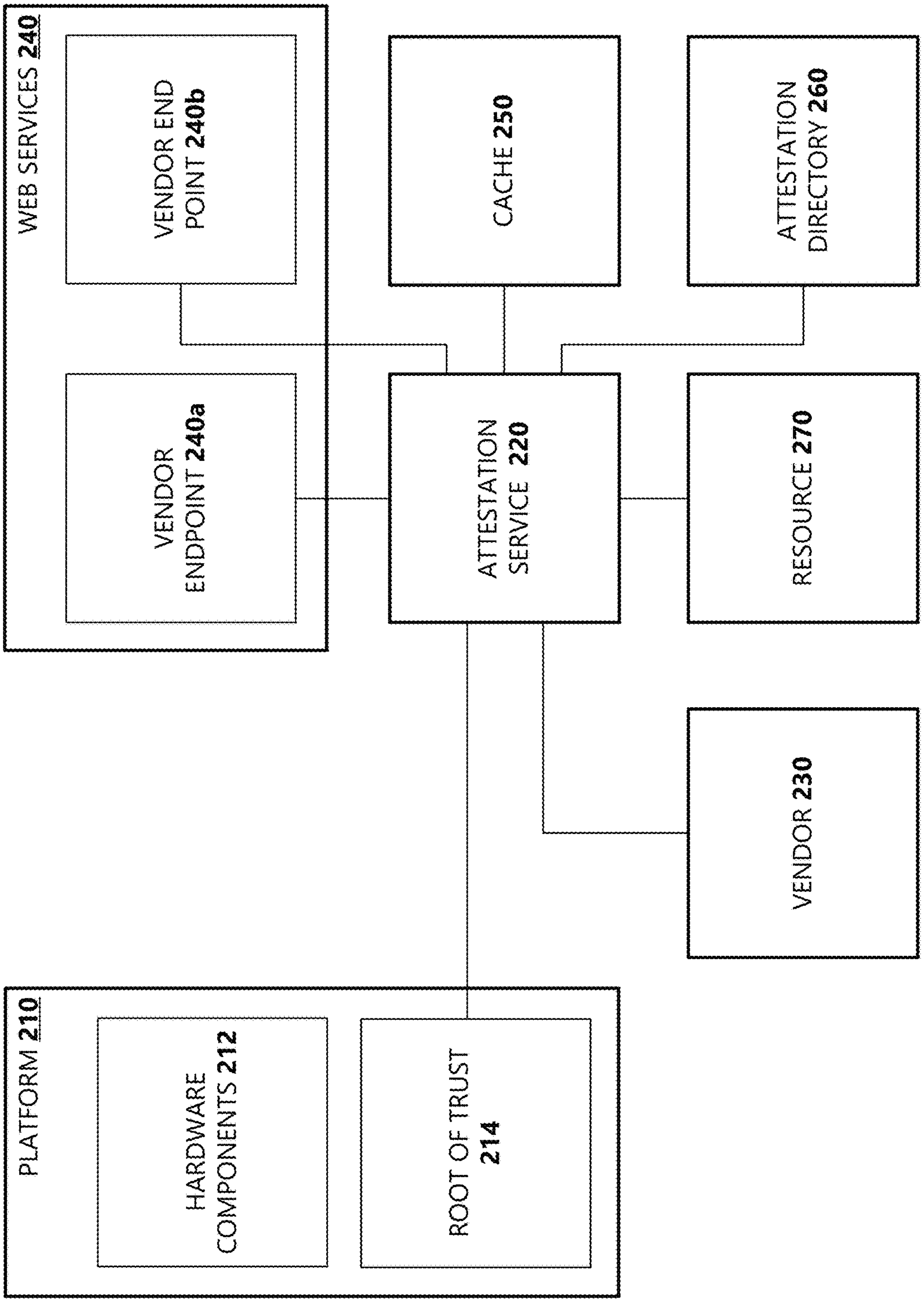
FIG. 2 illustrates various hardware and software services to attest to the firmware of hardware components.

FIG. 2 illustrates various hardware and software to attest to the validity of firmware of hardware components. Platform 210 is a computing system, such as computing device 110 (as shown in FIG. 1). Platform 210 may be a node in a computer rack or a computing instance in a cloud service. In some examples, platform 210 may comprise multiple copies of computing devices 110, forming a computer rack or an entire data center.

As illustrated in FIG. 2, platform 210 includes hardware components 212 running firmware and ROT 214 to determine firmware information. Hardware components 212 may include various hardware that are part of computing devices forming platform 210. Hardware components 212 may have hardware components of multiple copies of computing device 110 (as shown in FIG. 1). In some examples, Hardware components 212 are similar to hardware components 112 (as shown in FIG. 1) and can be used interchangeably. ROT 214 may be a single root of trust or multiple root of trusts (e.g., one for each computing device that is part of platform 210). In some examples, the multiple root of trusts are connected hierarchically. ROT 214 may collaborate with the root of trust of each computing device of platform 210 to retrieve firmware information from a trusted source, such as a location defined in secure boot. In some examples, ROT 214 is similar to ROT 114 (as shown in FIG. 1) and can be used interchangeably.

As illustrated in FIG. 2, attestation service 220 connects with various hardware and software to confirm the validity of firmware running on hardware components 212. Attestation service 220 is similar to attestation service 116 (as shown in FIG. 1) and can be used interchangeably. Attestation service 220 is connected to hardware components 212 to confirm the validity of the firmware running on hardware components 212 through ROT 214. Attestation service 220 confirms the validity of firmware by comparing the firmware information provided by ROT 214 against the latest firmware information by one or more sources, such as vendor 230, web services 240, or cache 250. Attestation service 220 uses these sources for static and dynamic firmware validation. Attestation service 220 may select one or more sources for the latest firmware information based on context in which attestation service 220 needs to access firmware information and attestation service 220's connectivity. For example, attestation service 220 accesses firmware information from vendor 230 when the firmware is being validated for the first time and accesses firmware information from web services 240 to validate future firmware updates. In another example, if the attestation service 220 cannot connect to web services 240, attestation service 220 uses firmware information from cache 250.

Attestation service 220 can perform static confirmation of firmware validity based on firmware information provided by vendor 230. Vendor 230 is the manufacturer of one or more hardware components 212. Vendor 230 may provide firmware and firmware information to platform 210 and attestation service 220. In one instance, vendor 230 provides the first copy of firmware information upon introducing a new hardware component in hardware components 212. The first copy of firmware information may include a golden hash used once to confirm the firmware was transmitted correctly. In some examples, attestation service 220 may use the firmware information provided by vendor 230 as a fallback when other sources are unavailable.

Attestation service 220 performs dynamic firmware validation by requesting firmware information from web services 240. Attestation service 220 may need additional information to access the latest firmware information from some of the sources. For example, attestation service 220 may need authentication information to access the latest firmware information. Attestation directory 260 may include a directory of authentication tokens to access firmware information from different vendors through web services 240. For example, attestation directory 260 may be an active directory with logic credentials to access the web services 240. In some examples, attestation directory 260 may be an authentication mechanism, such as Open Authorization (OAuth), to access firmware information from web services 240.

Attestation service 220 may store the firmware information of the latest version of firmware of hardware components 212 received from web services 240 in cache 250. In some examples, attestation service 220 may store firmware information upon a successful match of hashes present in the firmware information from ROT 214 and web services 240. Attestation service 220 may access firmware information from 250 when attestation service 220 cannot connect to web services 240. In some examples, firmware information stored in cache 250 may have an expiration period. Upon reaching the expiration period, attestation service 220 may access firmware information from web services 240 to store in cache 250 and refresh the expiration period.

Attestation service 220 may confirm the validity of firmware of hardware components 212 to allow platform 210 to access resource 270. In some examples, attestation service 220 may confirm validity and allow platform 210 to connect directly with resource 270. Attestation service 220 may need to confirm the firmware validity of a group of hardware components 212 for platform 210. Attestation service 220 may confirm the validity of the firmware of hardware components 212 to a user of platform 210. The attestation service may provide a user readable message that explains why a firmware is not valid and includes potential corrective actions. For example, a user readable message may explain whether the firmware is invalid because it is outdated, corrupted, or its configuration does not satisfy the security policies set for platform 210. The message may include the version of firmware to install on hardware components 212 to validate firmware and/or the configuration to use to meet requirements such as the security policy of platform 210.

Web service 240, connected to attestation service 220, provides firmware information to confirm the validity of firmware running on hardware components 212. Web service 240 includes multiple endpoints, such as vendor endpoints 240*a*-*b*, to provide firmware information for different firmware of different hardware components 212 and different manufacturers/vendors of hardware components 212. Vendor endpoints 240*a*-*b* may be structured based on the architecture of a hardware component or the firmware running on the hardware component. A detailed description of an example embodiment of endpoints setup is presented in FIG. 4 description below.

Figure 3:
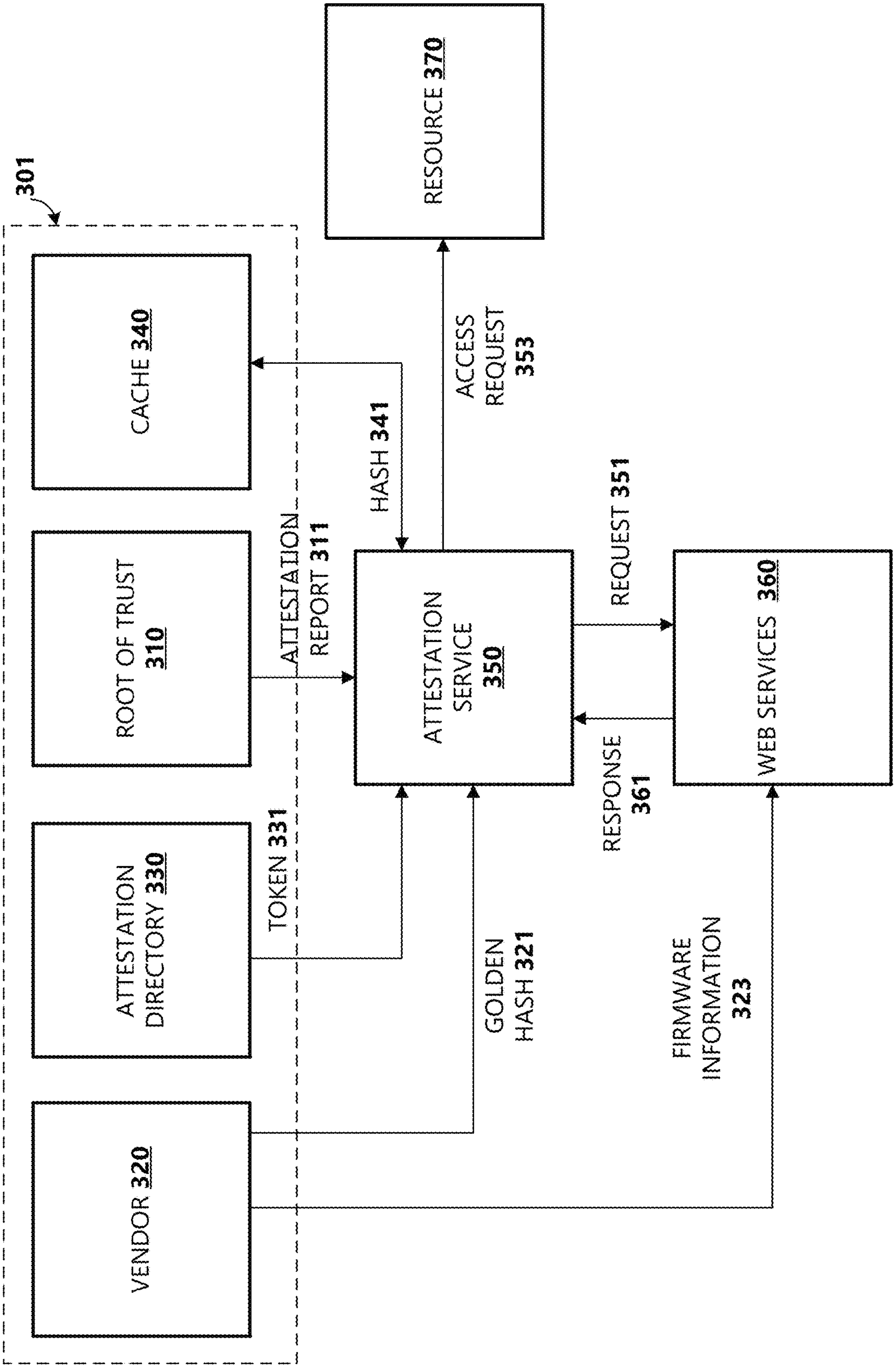
FIG. 3 is a flow diagram of the interaction between components of an example attestation system.

FIG. 3 is a flow diagram of the interaction between components of an example attestation system. As illustrated in FIG. 3, the flow between components of the attestation system (e.g., system 100 of FIG. 1) begins with input sources 301 providing information about the firmware transmitted to attestation service 350. The firmware information may be collective information about the firmware running on the hardware components (e.g., hardware components 212 of FIG. 2) and firmware expected to run on the hardware components. ROT 310 provides attestation report 311, which includes information about firmware running on the hardware components. Vendor 320 and cache 340 provide golden hash 321 and hash 341, which include information about firmware expected to run on the hardware components. ROT 310, vendor 320, and cache 340 are similar to ROT 214 (as shown in FIG. 2), vendor 230 (as shown in FIG. 2), and cache 250 (as shown in FIG. 2) and can be used interchangeably.

Input sources 301 may also include additional data needed to retrieve information about firmware. For example, attestation directory 330 may provide authentication information to attestation service 350 to access firmware information of the latest version of firmware from web services 360. Attestation directory 330 is similar to attestation directory 260 (as shown in FIG. 2) and can be used interchangeably. In some examples, some sources within input sources 301 may be alternate sources to access the latest information about firmware. For example, cache 340 may be an alternate source to provide hash 341 representing the known latest version of the firmware to attestation service 350 when attestation service 350 cannot connect to the web services 360 to retrieve the firmware information of the latest version of the firmware.

ROT 310 transmits attestation report 311 to attestation service 350. Attestation report 311 includes information about the firmware running on a hardware component. The content of attestation report 311 may include a hash of the firmware code representing the current state (version) of the firmware running on a hardware component. ROT 310 may compute the hash of the firmware code.

Attestation report 311 includes information about hardware components and the firmware running on hardware components. The information about the hardware components may include information uniquely identifying the hardware components and the platform hosting the hardware components. The information about the firmware may include an alphanumeric identifier identifying the firmware's version. For example, the alphanumeric identifier may be a static value provided by a vendor or a dynamic value such as a hash computed from firmware code. Attestation report 311 may also include information about the configuration of various features of the firmware and the hardware component running the firmware. The configuration information of various features of the firmware may include input values provided for the features (e.g., disk drive location of a kernel image to access to boot a computing system), a schedule for using the features (e.g., disk drive journal feature to log changes to the disk at the end of the day), or flags to turn the features on/off (e.g., an encryption feature of a disk drive for the drive to encrypt all stored data automatically can be turned on/off).

The information about the hardware components may include unique identifiers identifying the hardware components running firmware and the computing device (e.g., platform 210 of FIG. 2) hosting the hardware component. The unique identifier may be a network address, such as a medium access control (MAC) address or a serial number.

The information may also include a signature providing authenticity of the information received by the attestation service. In some examples, the signature is encrypted or represents an encrypted version of the entire information received by the attestation service. Attestation report 311 may be a structured document standardized across all hardware components. For example, attestation report 311 may be a JavaScript Object Notation (JSON) type document.

Vendor 320 transmits golden hash 321 to attestation service 350. Golden hash 321 represents a hash of the firmware code as computed by vendor 320. Vendor 320 may transmit golden hash 321 only once when a hardware component is installed. Attestation service 350 may use golden hash 321 to validate the firmware running on a hardware component for the first time and ensure it was transmitted correctly. Vendor 320 may also transmit firmware information 323 to web services 360 to store information about the latest version of the firmware in web services 360. Vendor 320 may compute the hash of the latest version of the firmware to include in firmware information 323. Vendor 320 may also include configuration for the latest firmware in firmware information 323.

Attestation directory 330 transmits token 331 to attestation service 350 to use along with the attestation report 311 provided by ROT 310 to access web services 360. Token 331 is an authentication token used by attestation service 350 to log into Web Services 360. Attestation service may include token 331 as part of request 351 to access firmware information of the latest version of firmware of a hardware component.

Cache 340 transmits hash 341 to attestation service 350. Cache 340 transmits hash 341 only when requested (not illustrated in FIG. 3) by attestation service 350. Cache 340 transmits hash 341, which was previously stored by attestation service 350. Attestation service 350 may process response 361 to retrieve hash 341 and transmit response 361 to cache 340 to store for future usage. In some examples, web services 360 may directly transmit hash 341 to cache 340. Cache 340 may also receive hash 341 for storage from vendor 320.

In some examples, attestation service 350 may parse response 361 to determine reasons for failure to validate the firmware of hardware components. The reasons may include information that includes corrective actions to be taken to resolve the validity of a firmware. For example, the reasons may include outdated or corrupted firmware, which can be resolved by downloading a new version of firmware. Attestation service 350 may take corrective actions as part of validating firmware. In some examples, web services 360 may perform the firmware validation and include reasons for failure to validate firmware and or corrective actions as part of response 361.

In some examples, the reasons for failure to validate firmware running on hardware components (e.g., hardware components 212 of FIG. 2), along with corrective actions, may be presented to a user of a platform (e.g., platform 210 of FIG. 2) hosting the hardware components. Attestation service 350 may present the reasons in the form of a user readable message. In some examples, the user readable message includes an explanation of the security setup and/or requirements of a component's firmware being validated to satisfy the security policy of a platform. The user readable message may be an auto-generated report informing the user about ways to successfully validate the firmware and/or satisfy the security policy of a platform hosting hardware components.

Attestation service 350 processes information from input sources 301 to confirm the validity of firmware running on a hardware component. Attestation service 350 uses information from input sources 301 to request web services 360 for information to validate the firmware running on a hardware component. In some examples, attestation service 350 may request web services 360 for additional information about the firmware running on a hardware component. As illustrated in FIG. 3, attestation service 350 transmits a request 351 to web services 360 to access firmware information. Request 351 includes token 331 for authentication and authorization to access firmware information. Request 351 also identifies the firmware whose information is requested by identifying the endpoint uniform resource identifier (URI) in web services 360. In some examples, request 351 includes a generic web service endpoint URI and information about firmware received from input sources 301. For example, request 351 may include a unique identifier of the hardware component running the firmware for web services 360 to look up the appropriate URI. A detailed description of delegating to different web service endpoints from a generic endpoint is presented in the FIG. 4 description below.

Web services 360 transmits response 361 to attestation service 350 to validate the firmware running on a hardware component. Response 361 includes information about the latest version of the firmware requested in request 351. Attestation service 350 parses response 361 to validate the firmware running on a hardware component. Response 361 includes the hash of the latest version of the firmware. Attestation service 350 compares the hash in response 361 with the hash in attestation report 311 to confirm validity if the hashes match. In some examples, response 361 may include additional information to confirm the validity of the firmware even if there is no match between the hashes. A detailed description of steps to confirm the validity of the firmware is presented in the FIG. 7 description below. When attestation service 350 determines the firmware is invalid, attestation service 350 requests the hardware component running the firmware to enter a recovery mode to be updated with the latest version of the firmware.

Upon confirmation of the firmware validity, attestation service 350 may transmit access request 353 to resource 370 for a hardware component to access resource 370. In some examples, a computing device (e.g., computing device 110 of FIG. 1) hosting a hardware component accesses resource 370 using the hardware component. For example, computing device 110 uses a network card hardware component to access resource 370 over a network (e.g., network 120 of FIG. 1). In some examples, a request to access resource 370 is managed by attestation service 350. Attestation service 350 may transform a request to access resource 370 to a request to validate the firmware of a hardware component needed to access resource 370.

Figure 4:
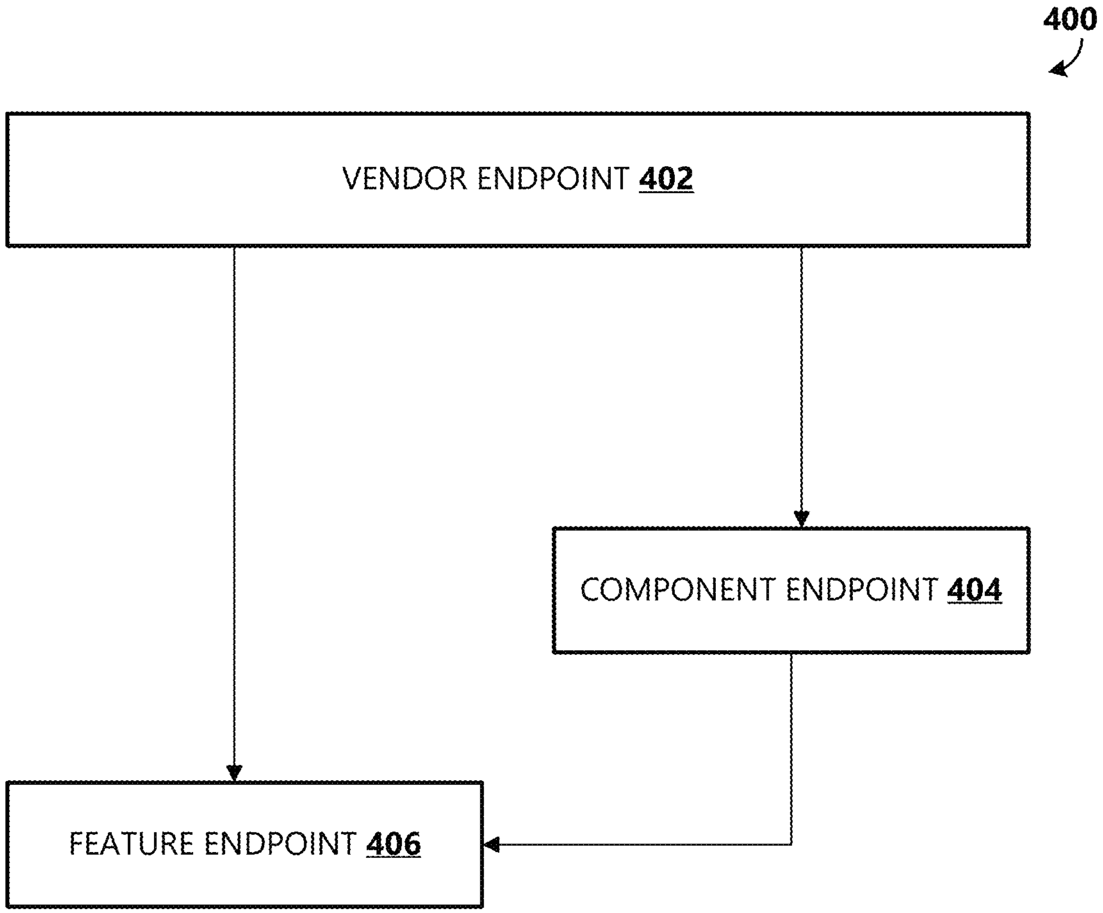
FIG. 4 illustrates a hierarchy of endpoints of a web service to validate the firmware of a hardware component.

FIG. 4 illustrates a hierarchy of endpoints of a web service to validate the firmware of a hardware component. Web services 360 (as shown in FIG. 3) may include a hierarchy of endpoints to receive requests from attestation service 350 (as shown in FIG. 3) to retrieve information about the latest version of the firmware. An endpoint mentioned as URI in a request (e.g., request 351 of FIG. 3) identifies the firmware. In some examples, the requested endpoint identifies a specific endpoint that alone can respond to a request for information about the latest firmware version. In some examples, the requested endpoint may generate multiple requests to additional endpoints.

As illustrated in FIG. 4, endpoints may be arranged in a three-level hierarchy. It should be noted that endpoint arrangement is based on the architecture of a hardware as designed by a manufacturer of the hardware. Vendor endpoint 402 may be a generic URI of web services 360 (as shown in FIG. 3) called by attestation service 350 (as shown in FIG. 3) for accessing firmware information for hardware components 212 (as shown in FIG. 2). In some examples, attestation service 350 may reach vendor endpoint 402 when attestation service 350 is unaware of the exact endpoint to access information about the firmware. Attestation service 350 may be unaware of the endpoint due to unawareness of the architecture of a hardware component running the firmware. For example, attestation service 350 may be unaware of a sub-component of a hardware component associated with component endpoint 404. In some examples, attestation service 350 may be unaware of the endpoint due to unawareness of the architecture of firmware running on the hardware component. For example, attestation service 350 may be unaware of a firmware feature associated with feature endpoint 406. In some examples, attestation service 350 may reach vendor endpoint 402 the first time attestation service 350 connects with web service 360. Vendor endpoint 404 may provide as part of a response (e.g., response 361 of FIG. 3) the firmware information, including a hash, to confirm the validity of firmware. In some examples, the response includes a hierarchy of endpoints and each associated sub-component of a hardware component. The firmware information may also include features of a firmware running on a hardware component.

Component endpoint 404 may be an endpoint that provides firmware information for a sub-component within a hardware component. For example, a graphics card hardware component has separate firmware for individual sub-components, such as a shader or a cooling unit, which is validated by a separate endpoint, such as component endpoint 404. Component endpoint 404 may be an endpoint of a third party not exposed by a manufacturer of a hardware component.

Feature endpoint 406 is associated with a feature within the firmware that can be configured to be turned on/off. For example, firmware associated with a solid state drive (SSD) component includes an encryption feature and an endpoint associated with the encryption feature. In some instances, the feature endpoint 406 may be a component endpoint 404 with the feature implemented using dedicated hardware. For example, a crypto accelerator hardware component may be part of an SSD component. Feature endpoint 404 may be an endpoint of a third party not exposed by a vendor of a hardware component.

Having described a system that may be employed by the aspects disclosed herein, this disclosure will now describe methods that may be performed by various aspects of the disclosure. In aspects, methods 500-700 may be executed by a system, such as system 100 of FIG. 1. However, methods 500-700 are not limited to such examples.

Figure 5:
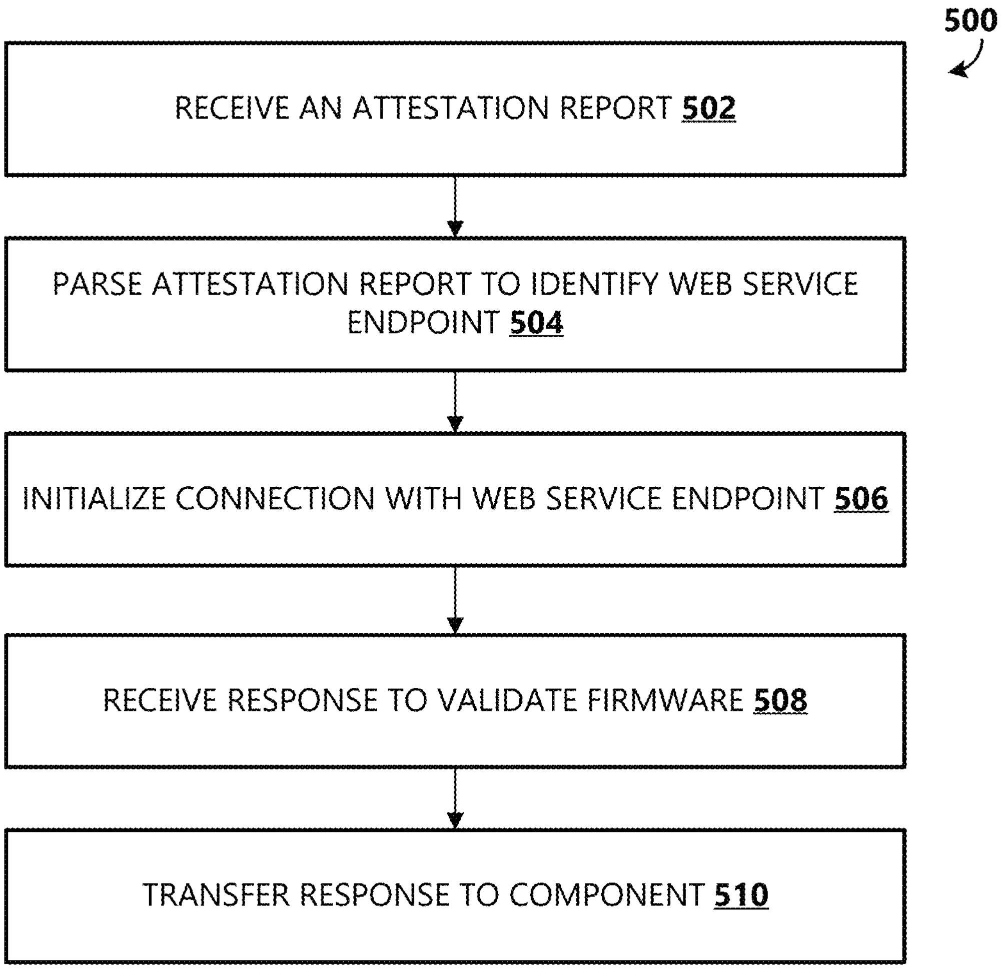
FIG. 5 depicts an example method for dynamically attesting device firmware.

FIG. 5 depicts an example method for dynamically attesting device firmware. At operation 502, the attestation service (e.g., attestation service 350 of FIG. 3) may receive an attestation report (e.g., attestation report 311 of FIG. 3). The attestation service may receive the attestation report from a platform (e.g., platform 210 of FIG. 2) hosting one or more hardware components (e.g., hardware components 112 of FIG. 1). The attestation report may include information about the firmware running on one or more hardware components. The attestation report includes information about one or more hardware components and the firmware running on one or more hardware components.

At operation 504, the attestation service may parse an attestation report to identify a web service endpoint (e.g., vendor endpoint 240*a* of FIG. 2). The attestation service may begin by verifying that the attestation report is from a valid component by decrypting the signature and/or the received information in the attestation report to verify the authenticity of the attestation report and the component which provided the information to populate the attestation report.

As part of parsing the attestation report, the attestation service may determine the endpoints of a web service (e.g., web services 140 of FIG. 1) that are each associated with the firmware of hardware components. The endpoint may be a URI of a web service identified using a universal resource locator (URL). The attestation service may determine endpoints using the unique identifiers of the hardware components included in the attestation report. The attestation service may look up in a table mapping identifiers to web service endpoint URIs. In some examples, the hash of the firmware code may be used as a key to look up a web service endpoint URI.

At operation 506, the attestation service may initialize a connection with the web service endpoint. The attestation service may authenticate the attestation service before initializing a connection. The attestation service transmits a request (e.g., request 351 of FIG. 3) to a web service, including a token (e.g., token 331) for authentication and a request to access the information about the latest version of the firmware. A detailed description of the process of authenticating access to a web service endpoint is provided in the FIG. 6 description below. Additionally, the contents of the connection request are presented in FIG. 3 description above.

At operation 508, the attestation service may receive a response (e.g., response 361 of FIG. 3) from a web service endpoint. The response may include information about the firmware to confirm the validity of the firmware running on a hardware component. The response may include a validation of firmware of a hardware component. In some examples, the response may include information about the latest valid version of firmware to use to determine the validity of the firmware running on a hardware component. In some examples, instructions are provided to confirm the validity of the firmware running on a hardware component. A detailed description of various methods of confirming the validity of the firmware based on the response from the web service is presented in FIG. 7 description below.

At operation 510, the attestation service transfers the response to the hardware component. In some examples, the attestation service may transfer the response confirming the validity of the hardware component. In some examples, the attestation service may process the response to confirm firmware validity before transmitting the confirmation to the hardware component. For example, the attestation service may compare information about the firmware in the response with the information about the firmware running on the hardware component in the attestation report to confirm firmware validity and share the result with the hardware component.

Figure 6:
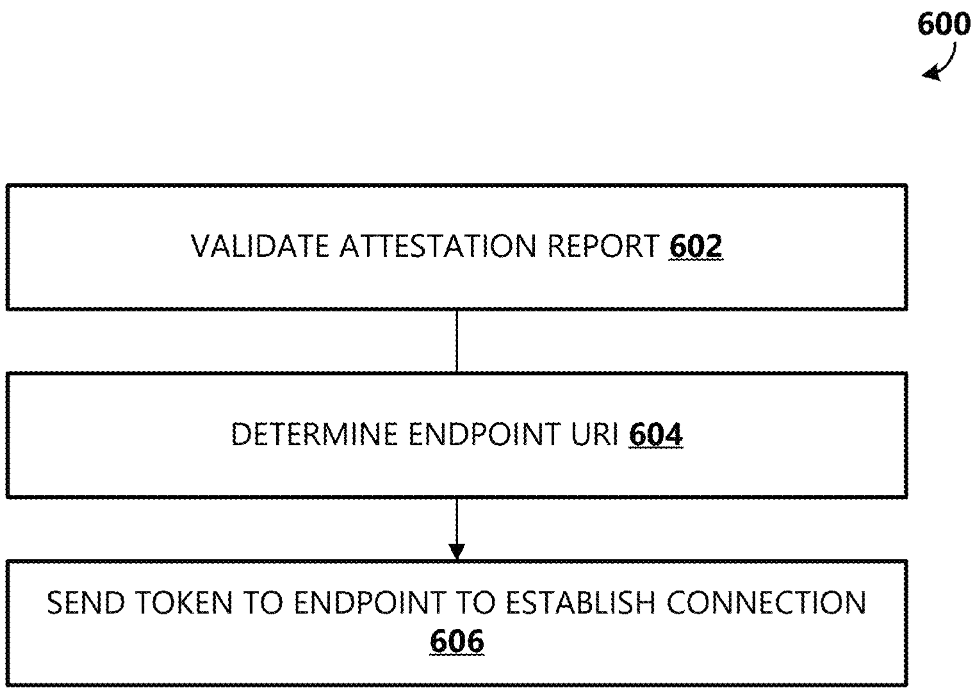
FIG. 6 depicts an example method for connecting with an endpoint to validate device firmware.

FIG. 6 depicts an example method for connecting with an endpoint to validate device firmware. At operation 602, the attestation service (e.g., attestation service 350 of FIG. 3) may validate the attestation report (e.g., attestation report 311 of FIG. 3) received from a hardware component (e.g., hardware components 212 of FIG. 2) directly or via a root of trust (e.g., ROT 214 of FIG. 4) of a computing device (e.g., platform 210 of FIG. 2) hosting the hardware component.

At operation 604, the attestation service determines endpoint URI (e.g., vendor endpoint 240*a* of FIG. 2) based on the content of the attestation report. The attestation service may use the unique identifier of the hardware component, such as a serial number or a hash of the firmware code running on the hardware component, to determine the endpoint URI. The attestation service may utilize a mapping between the unique identifier or firmware hash and the endpoint URI. In some examples, the endpoint URI may be listed directly in the attestation report.

At operation 606, the attestation service transmits a token (e.g., token 331 of FIG. 3) to the endpoint URI determined in operation 604 to establish a connection with a web service (e.g., web services 360 of FIG. 3). The attestation service may retrieve an authentication token from an attestation directory (e.g., attestation directory 260 of FIG. 2). The attestation service may use the unique identifier or the hash of the firmware to determine the authentication token for establishing a connection with the web service. In some examples, the authentication token may be determined based on the endpoint URI. In some examples, the authentication token is determined based on the web service server to access information about firmware running on a hardware component or based on the manufacturer of the hardware component. The attestation service may have a mapping between the authentication token and either the web service server or the hardware component's manufacturer.

Figure 7:
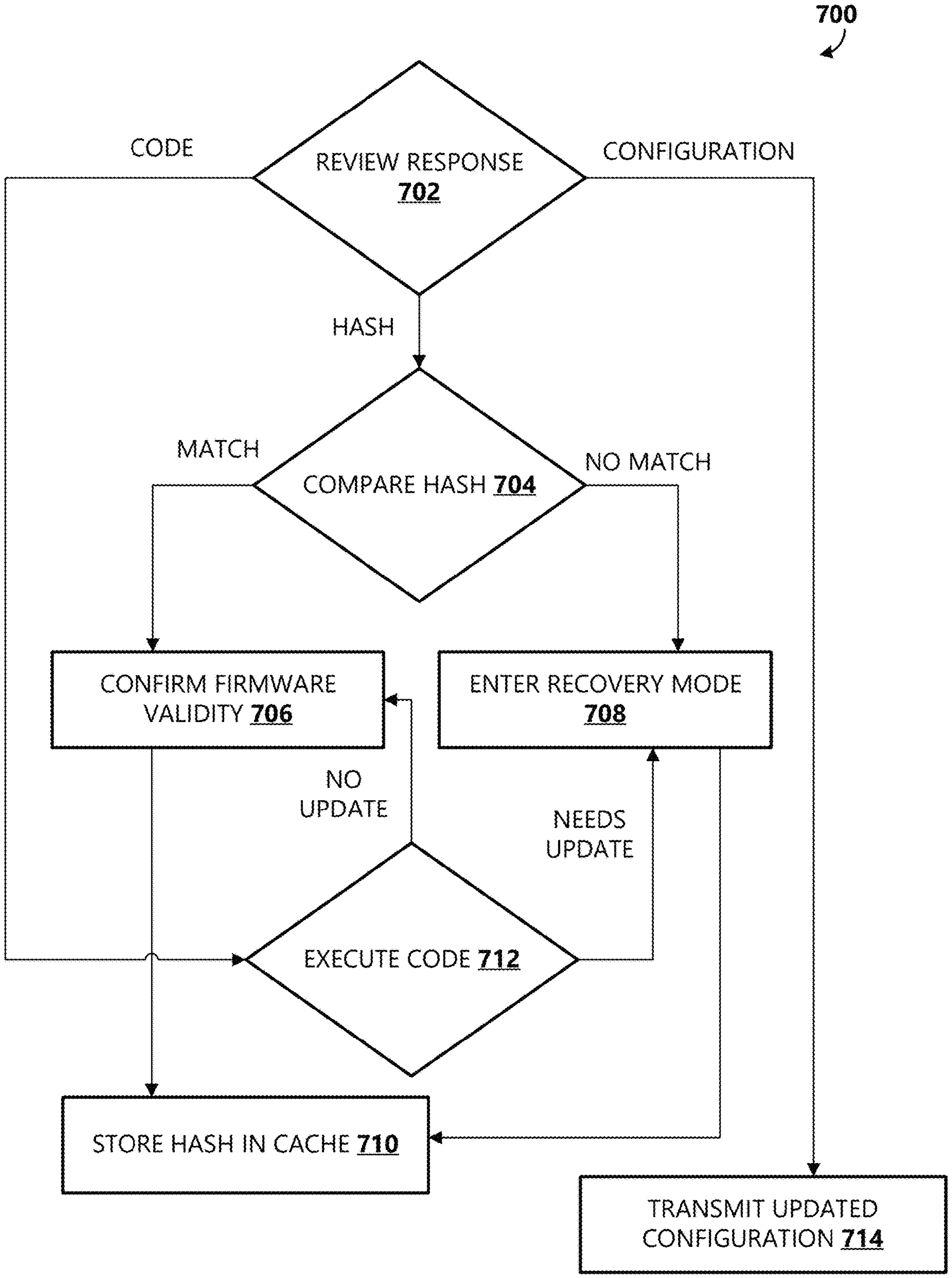
FIG. 7 depicts an example method for evaluating the response from a vendor endpoint to validate the firmware of a hardware component of a device.

FIG. 7 depicts an example method for evaluating the response from a vendor endpoint to validate the firmware of a hardware component of a device. At operation 702, the attestation service (e.g., attestation service 350 of FIG. 3) reviews the response (e.g., response 361 of FIG. 3) to determine its content. If the response content is code, then method 700 proceeds to operation 712. If the response content is a configuration, then method 700 proceeds to operation 714. Otherwise, the response content is a hash, and method 700 proceeds to operation 704. In some examples, the response may include a combination of all types of content, such as the code, configuration, and hash, and method 700 may execute multiple paths illustrated in FIG. 7 in a sequential order.

At operation 704, the attestation service compares hashes from the response to the hash from an attestation report sent previously by a ROT (e.g., ROT 310 of FIG. 3). The attestation service retrieves the hash from the response and the hash from the attestation report received from a hardware component (e.g., hardware components 212 of FIG. 2). The hash from the response is the hash computed using the latest version of the firmware code of a hardware component as identified by the manufacturer of the hardware component. The hash in the attestation report is the hash of the firmware code running on the same hardware component.

If the hashes are compared and they match, method 700 proceeds to operation 706. Otherwise, the hashes do not match, and method 700 proceeds to operation 708.

At operation 706, the attestation service confirms the validity of firmware running on a hardware component. The attestation service confirms the validity by transferring the confirmation to the hardware component running the firmware or the computing device (e.g., platform of FIG. 2) hosting the hardware component. The hardware component can continue to operate upon receiving the confirmation, and the computing device may continue using the hardware component. In some examples, the attestation service confirms the validity of firmware by allowing the hardware component access to a resource (e.g., resource 370 of FIG. 3). The computing device hosting hardware component accesses the resource using the hardware component.

At operation 708, the attestation service makes the hardware component enter a recovery mode as the firmware running on the hardware component does not match the latest version of the firmware and needs to be updated. Upon entering the recovery mode, the computing device updates the hardware component with the latest version of the firmware. The computing device may batch process and wait for upgrade requests to multiple hardware components.

At operation 710, the attestation service stores the hash in the response in the cache storage (e.g., cache 250 of FIG. 2). The attestation service stores the hash in the cache storage to utilize the hash when the web service is offline and cannot be reached by the attestation service. The hash in the cache storage acts as the latest known version of the firmware.

At operation 712, the attestation service executes the code present in the response. The code may be an algorithm to determine the validity of the firmware running on a hardware component. The executed code may include steps to compare hashes of the latest firmware and the firmware running on a hardware component and alternative steps when the hashes do not match. The alternate steps may allow the existing firmware running on a hardware component to continue even if the hashes do not match. For example, the code determining that the hashes do not match may include steps to confirm whether the hardware version of the hardware component matches the hardware version required for the latest version of the firmware. If the hardware versions do not match as the hardware component is older, then the latest version of the firmware is not for the version of the component, and the attestation service confirms the validity of the firmware currently running on the hardware component. In another example, the code determining the hashes do not match may include steps to confirm if the updated firmware feature is configured for use. The attestation service may review the configuration of the hardware component available in the attestation report to determine if a hardware or firmware feature is configured for use by a user of the hardware component. Suppose the updated firmware is linked to the same hardware or firmware feature not configured for use. In that case, the attestation service confirms the validity of the firmware currently running on a hardware component.

At operation 714, the attestation service transmits the updated configuration to the hardware component to validate its firmware. The new configuration may allow access to multiple features not available in the configuration associated with the firmware currently running on a hardware component.

FIG. 8 is a block diagram illustrating the physical components (e.g., hardware) of a computing device 800 with which examples of the present disclosure may be practiced. The computing device components described below may be suitable for one or more of the components of the systems described above. In a basic configuration, the computing device 800 includes at least one processing unit 802 and a system memory 804. Depending on the configuration and type of computing device 800, the system memory 804 may comprise volatile storage (e.g., random access memory), non-volatile storage (e.g., read-only memory), flash memory, or any combination of such memories. The system memory 804 may include an operating system 805 and one or more program modules 806 suitable for running software applications 850 (e.g., attestation service 116, authentication service 330, and web services 130 of FIG. 1) and other applications.

The operating system 805 may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including one or more of the stages of methods 500, 600, and 700 illustrated in FIGS. 5-7. Other program modules that may be used in accordance with examples of the present disclosure and may include applications such as search engines and database applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units, and various application functionality, all of which are integrated (or "burned") onto the chip substrate as a single integrated circuit. When operating via an SOC, the functionality described herein with respect to detecting an unstable resource may be operated via application-specific logic integrated with other components of the computing device 800 on the single integrated circuit (chip). Examples of the present disclosure may also be practiced using other technologies capable of performing logical operations such as, for example, AND, OR, and NOT, including mechanical, optical, fluidic, and quantum technologies.

The computing device 800 may also have one or more input device(s) 812 such as a keyboard, a mouse, a pen, a sound input device, a touch input device, a camera, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include radio frequency (RF) transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 804, the removable storage device 809, and the non-removable storage device 810 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer readable media may be part of the computing device 800. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to for dynamic verification of an attestation report on a system. The system includes at least one processor, and memory coupled to the processor, the memory consisting of computer executable instructions that are executed by the system to perform operations. The operation include: receiving, from a platform, an attestation report populated with information about one or more components in the platform, parsing the attestation report to identify one or more web service endpoints of a vendor associated with a component of the one or more components, initializing a connection with an endpoint of the one or more web service endpoints, receiving, from the endpoint, a response, wherein the response includes a code to evaluate validity of firmware in the component of the one or more components, and upon evaluating the validity of the firmware, transferring the response to the component.

In an example, the information about one or more components further includes at least one of: a unique identifier of the platform, a unique identifier of each of the one or more components of the platform, a hash value of the firmware in each of the one or more components, configuration of one or more features of the firmware in each of the one or more components, and an encrypted signature of the information. In another example, parsing the attestation report to identify one or more endpoints to connect with one or more vendors further includes: verifying the encrypted signature to confirm that the attestation report is from a valid component of the one or more components of the platform, and determining the one or more endpoints based on a unique identifier of the valid component. In still another example, code to evaluate validity of firmware in the component includes a hash value of the latest firmware of the component. In yet another example, evaluating validity of the firmware includes: comparing the hash value of the latest firmware of the component to a hash value of a firmware of the component in the attestation report, and upon finding a match, confirming the validity of the firmware. In still yet another example, the operations further include: upon not finding a match, transmitting to the component a command to enter recovery mode. In a further example, code to evaluate validity of firmware in the component includes an updated configuration of the component. In a still further example, transferring the response to the component further includes: requesting the component to replace the configuration of the component with an updated configuration in the response.

In an example, evaluating validity of the firmware includes: executing the code to evaluate if the firmware of the component needs to be updated, and upon determining the firmware needs to be updated, transmitting to the component a command to enter recovery mode.

In an example, information is formatted as a JavaScript Object Notation (JSON) file.

In an example, the operations further include: storing the response in a cache storage associated with the attestation system.

In another aspect, the technology related to a computer-implemented method for runtime profiling workload on a system on a chip (SOC). The method includes: receiving, from a platform, the attestation report populated with information about one or more components in the platform, parsing the attestation report to identify one or more web service endpoints of a vendor associated with a component of the one or more components, initializing a connection with an endpoint of the one or more web service endpoints, receiving, from the endpoint, a response, wherein the response includes a code to evaluate validity of firmware in the component of the one or more components, and upon evaluating the validity of the firmware, transferring the response to the component.

In an example, the information about one or more components further includes at least one of: a unique identifier of the platform, a unique identifier of each of the one or more components of the platform, a hash value of the firmware in each of the one or more components, configuration of one or more features of the firmware in each of the one or more components, and an encrypted signature of the information. In another example, parsing the attestation report to identify one or more endpoints to connect with one or more vendors further includes: verifying the encrypted signature to confirm that the attestation report is from a valid component of the one or more components of the platform, and determining the one or more endpoints based on a unique identifier of the valid component. In still another example, code to evaluate validity of firmware in the component includes a hash value of the latest firmware of the component. In yet another example, evaluating validity of the firmware includes: comparing the hash value of the latest firmware of the component to a hash value of a firmware of the component in the attestation report, and upon finding a match, confirming the validity of the firmware. In still yet another example, the operations further include: upon not finding a match, transmitting to the component a command to enter recovery mode.

In an example, evaluating validity of the firmware comprises: executing the code to evaluate if the firmware of the component needs to be updated, and upon determining the firmware needs to be updated, transmitting to the component a command to enter recovery mode.

In still another aspect, the technology relates to for dynamic verification of an attestation report on a system. The system includes at least one processor, and memory coupled to the processor, the memory consisting of computer executable instructions that are executed by the system to perform operations. The operation include: receiving, from a platform, an attestation report populated with information about one or more components in the platform, wherein the information includes configuration of one or more features of firmware in each of the one or more components, parsing the attestation report to identify one or more web service endpoints of a vendor associated with a component of the one or more components, initializing a connection with an endpoint of the one or more web service endpoints, receiving, from the endpoint, a response, wherein the response includes a hash value of a latest version of the firmware of the component, and determining whether to update the firmware in the component to the latest version based on the configuration of one or more features of the firmware.

In an example, the operations further include: upon determining the firmware needs to be updated to the latest version of the firmware, presenting a user readable message to a user of the attestation system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An attestation system comprising:

a processor; and memory comprising computer executable instructions that, when executed, perform operations comprising:

receiving, from a platform, an attestation report comprising:

information about one or more components of the platform; and an encrypted signature verifying the attestation report is provided by a valid component of the one or more components;

parsing the attestation report to identify one or more web service endpoints of a vendor associated with a component of the one or more components based on at least one unique identifier of the one or more components included in the attestation report;

initializing a connection with an endpoint of the one or more web service endpoints;

receiving, from the endpoint, a response, wherein the response includes executable code to evaluate validity of firmware in the component of the one or more components;

evaluating the validity of the firmware of the component by executing the executable code; and upon evaluating the validity of the firmware, transferring an indication of the validity of the firmware to the component.

2. The system of claim 1, wherein the information about the one or more components further includes at least one of:

a unique identifier of the platform, the at least one unique identifier of the one or more components, a hash value of the firmware in each of the one or more components, and a configuration of one or more features of the firmware in each of the one or more components.

3. The system of claim 2, wherein parsing the attestation report to identify one or more endpoints to connect with the vendor further comprises:

verifying the encrypted signature to confirm that the attestation report is from a valid component of the one or more components of the platform; and determining the one or more endpoints based on a unique identifier of the valid component.

4. The system of claim 2, wherein the executable code includes a hash value of a latest firmware of the component.

5. The system of claim 4, wherein evaluating validity of the firmware comprises:

comparing the hash value of the latest firmware of the component to a hash value of a firmware of the component in the attestation report; and upon finding a match, confirming the validity of the firmware.

6. The system of claim 5, wherein the operations further comprise:

upon not finding a match, transmitting to the component a command to enter recovery mode.

7. The system of claim 1, wherein the executable code includes an updated configuration of the component.

8. The system of claim 2, wherein transferring the response to the component further comprises:

requesting the component to replace the configuration of the component with an updated configuration in the response.

9. The system of claim 1, wherein evaluating the validity of the firmware of the component comprises:

upon determining the firmware needs to be updated, transmitting to the component a command to enter recovery mode.

10. The system of claim 1, wherein the information about the one or more components of the platform is formatted as a JavaScript Object Notation (JSON) file.

11. The system of claim 1, wherein the operations further comprise:

storing the response in a cache storage associated with the attestation system.

12. A computer implemented method for dynamic verification of an attestation report on a system, the method comprises:

receiving, from a platform, the attestation report comprising:

information about one or more components of the platform; and an encrypted signature verifying the attestation report is provided by a valid component of the one or more components;

parsing the attestation report to identify one or more web service endpoints of a vendor associated with a component of the one or more components based on at least one unique identifier of the one or more components included in the attestation report;

initializing a connection with an endpoint of the one or more web service endpoints;

receiving, from the endpoint, a response, wherein the response includes executable code to evaluate validity of firmware in the component of the one or more components;

evaluating the validity of the firmware of the component by executing the executable code; and upon evaluating the validity of the firmware, transferring an indication of the validity of the firmware to the component.

13. The method of claim 12, wherein the information about the one or more components further includes at least one of:

a unique identifier of the platform, the at least one unique identifier of the one or more components, a hash value of the firmware in each of the one or more components, and a configuration of one or more features of the firmware in each of the one or more components.

14. The method of claim 13, wherein parsing the attestation report to identify one or more endpoints to connect with the vendor further comprises:

verifying the encrypted signature to confirm that the attestation report is from a valid component of the one or more components of the platform; and determining the one or more endpoints based on a unique identifier of the valid component.

15. The method of claim 13, wherein the executable code includes a hash value of a latest firmware of the component.

16. The method of claim 15, wherein evaluating validity of the firmware comprises:

comparing the hash value of the latest firmware of the component to a hash value of a firmware of the component in the attestation report; and upon finding a match, confirming the validity of the firmware.

17. The method of claim 16, wherein the method further comprises:

upon not finding a match, transmitting to the component a command to enter recovery mode.

18. The method of claim 12, wherein evaluating the validity of the firmware of the component comprises:

upon determining the firmware needs to be updated, transmitting to the component a command to enter recovery mode.

19. An attestation system comprising:

a processor; and memory comprising computer executable instructions that, when executed, perform operations comprising:

receiving, from a platform, an attestation report comprising:

information about one or more components of the platform, wherein the information includes configuration of one or more features of firmware in each of the one or more components; and an encrypted signature verifying the attestation report is provided by a valid component of the one or more components;

parsing the attestation report to identify one or more web service endpoints of a vendor associated with a component of the one or more components based on at least one unique identifier of the one or more components included in the attestation report;

initializing a connection with an endpoint of the one or more web service endpoints;

receiving, from the endpoint, a response, wherein the response includes executable code to evaluate validity of the firmware of the component;

evaluating the validity of the firmware of the component by executing the executable code; and upon evaluating the validity of the firmware, transferring an indication of the validity of the firmware to the component.

20. The system of claim 19, wherein the information about the one or more components further includes at least one of:

a unique identifier of the platform, the at least one unique identifier of the one or more components, a hash value of the firmware in each of the one or more components, and a configuration of one or more features of the firmware in each of the one or more components.

* * * * *